United States Patent
Hod (10) Patent No.: US 9,400,732 B2
(45) Date of Patent: Jul. 26, 2016

(54) PERFORMANCE REGRESSION TESTING IN PRESENCE OF NOISE

(71) Applicant: Red Hat Israel, Ltd., Raanana (IL)

(72) Inventor: Ronen Hod, Shoham (IL)

(73) Assignee: Red Hat Israel, Ltd., Raanana (IL)

( * ) Notice: Subject to any disclaimer, the term of this patent is extended or adjusted under 35 U.S.C. 154(b) by 153 days.

(21) Appl. No.: 14/282,084

(22) Filed: May 20, 2014

(65) Prior Publication Data
US 2015/0339207 A1    Nov. 26, 2015

(51) Int. Cl.
G06F 9/45     (2006.01)
G06F 9/44     (2006.01)
G06F 11/34    (2006.01)

(52) U.S. Cl.
CPC ............ *G06F 11/3409* (2013.01); *G06F 11/34* (2013.01)

(58) Field of Classification Search
CPC ... G06F 8/71; G06F 11/3466; G06F 11/3452; G06F 11/3447; G06F 2201/865
See application file for complete search history.

(56) References Cited

U.S. PATENT DOCUMENTS

| | | | |
|---|---|---|---|
| 7,283,982 B2 | 10/2007 | Pednault | |
| 7,702,958 B2 | 4/2010 | Kwong et al. | |
| 7,890,806 B2 | 2/2011 | Kwong et al. | |
| 8,161,458 B2* | 4/2012 | Johnson | G06F 8/71 717/122 |
| 8,196,115 B2 | 6/2012 | Dimpsey et al. | |
| 8,418,150 B2* | 4/2013 | Thirumalai | G06F 11/3428 711/154 |
| 8,966,462 B2* | 2/2015 | Gounares | G06F 9/5016 707/813 |
| 8,972,940 B2* | 3/2015 | Kannan | G06F 8/77 717/124 |
| 9,111,227 B2* | 8/2015 | Tonouchi | G06F 11/3485 |
| 2011/0107154 A1* | 5/2011 | Breitgand | G06F 11/008 714/47.2 |
| 2012/0079456 A1 | 3/2012 | Kannan et al. | |
| 2013/0080760 A1* | 3/2013 | Li | G06F 11/3409 713/100 |
| 2013/0152047 A1* | 6/2013 | Moorthi | G06F 11/368 717/124 |
| 2015/0254165 A1* | 9/2015 | Baril | G06F 11/3688 714/38.1 |

OTHER PUBLICATIONS

Heider et al., Using regression testing to analyze the impact of changes to variability models on products, Sep. 2012, 10 pages.*
Kim et al., Program element matching for multi-version program analyses, May 2006, 7 pages.*
Nguyen et al., Automated detection of performance regressions using statistical process control techniques, Apr. 2012, 12 pages.*

(Continued)

*Primary Examiner* — Thuy Dao
(74) *Attorney, Agent, or Firm* — Lowenstein Sandler LLP (57) ABSTRACT

A method and system includes calculating a performance metric for each of a plurality of builds of a software application in view of a respective performance test result associated with each of the plurality of builds, calculating a respective difference in performance metrics for each pair of consecutive builds of the plurality of builds, determining a largest performance drop in view of respective differences in the performance metrics among the pairs of consecutive builds of the plurality of builds, wherein the largest performance drop is associated with a first pair of consecutive builds comprising a first build and a second build, determining, by a processing device, a confidence level associated with the largest performance drop in view of performance test results associated with the first build and the second build, in response to determining that the confidence level is greater than or equal to a threshold, identifying one of the first build or the second build as a problematic build of the software application.

20 Claims, 4 Drawing Sheets

(56) References Cited

OTHER PUBLICATIONS

Baluja, S., et al. "Statistical Machine Learning for Large-Scale Optimization", Neural Computing Surveys 3, pp. 1-5, 2000 ftp://togo.icsi.berkeley.edu/global/pub/ai/jagota/vol3_1.pdf.

Couder, Christian, "Fighting Regressions with Git Bisect", Nov. 11, 2008, pp. 1-21 (Last updated Feb. 15, 2013) https://www.kernel.org/pub/software/scm/git/docs/git-bisect-lk2009.html.

Heger, Christoph, et al., "Automated Root Cause Isolation of Performance Regressions During Software Development", ICPE '13, Apr. 21-24, 2013, Prague, Czech Republic, 12 pages. http://sdqweb.ipd.kit.edu/publications/pdfs/heger2013a.pdf.

Huang, Peng, et al., "Performance Regression Testing Target Prioritization Via Performance Risk Analysis", ICSE '14, May 31-Jun. 7, 2014, Hyderabad, India, 12 pages http://cseweb.ucsd.edu/~peh003/perfscope-icse14.pdf (Retrieved from website Apr. 11, 2014).

* cited by examiner

FIG. 1

| Builds 202 | Performance Test Results 204 | Metrics 206 |
|---|---|---|
| Build A | TA.1, TA.2, TA.3 | MA |
| Build B | TB.1, TB.2 | MB |
| Build C | | |
| Build D | | |
| Build E | | |
| Build F | TF.1 | MF |
| Build Z | TZ.1, TZ.2 | MZ |

PERFORMANCE REGRESSION TESTING IN PRESENCE OF NOISE

TECHNICAL FIELD

This disclosure relates to the field of software performance testing and, in particular, to software performance regression testing in the presence of noise.

BACKGROUND

Software applications including system software and application software are often developed through stages. For example, a software application may first be coded and built as an executable software application including certain basic features. Subsequently, the code may be modified and augmented with more features and bug fixes. The modified and augmented codes may then be built as an updated version of the software application. This process may continue through the life cycle of the software application, including major revisions and minor updates/fixes. In practice, each update or revision of the software application may be a version of the product that may be referred to as a build of the software application. A build of a software application can be a released or unreleased version of the software application, and can be the executable code compiled from source codes of the software application or can be scripts. Thus, a software application may have undergone multiple builds during its life cycle.

A software application may be tested before being released as an executable version of the software application. The software application may or may not be thoroughly performance tested prior to the release. For example, if the modification to the software application is designed to fix a particular bug, the test before the release of the build may be limited to the specific bug rather than a full performance test. In other occasions, a build may include major updates to the software application. Under this scenario, all aspects of the software application performance may be tested. Software performance testing may include load testing, stress testing, endurance testing, and spike testing. The test results may include the measurement of a set of performance parameters while executing the software application. The set of performance parameters may include, e.g., server response time, computational resource (such as CPU) consumption, and throughput of a system, under different performance testing scenarios. Although software applications are tested before being released, modern software applications are so complicated that any performance test can only be achieved to the extent that testing resources are allowed and by no means exhaustive. Certain aspects of the performance testing may have been missed due to noise in the testing results. Thus, certain performance degradations may not exhibit in the immediate build that includes the code causing the performance degradation. Instead, the performance degradation exhibited may have been caused by the modifications done in a much earlier build.

Regression testing has been used to determine which build out of a series of builds causes the performance degradation. Namely, whenever a performance degradation or bug is uncovered for a new version of a software application, a bisect method is used to determine which build of the software application is the real culprit of the performance degradation or bug. Assuming a certain prior build is known to be reliable (e.g., a build that has been thoroughly tested), the bisect method may include executing performance tests on a build in the middle between the known reliable build and the newest build of the software application to determine if the tested build is problematic. The bisect method is then repeated between the known reliable and the middle build if the performance of the middle build shows degradations, or the bisect method is repeated between the middle build and the newest build if the performance of the middle build shows no degradation.

However, under certain circumstances, the bisect method does not reliably identify the problematic build when the performance test results contain noise. Due to inaccuracy in test performance measurements, insufficient test time, and unpredictable factors during the execution of the software application, the test results may be inconsistent, or even worse, it sometimes may present contrary results. The noise in the performance test results may lead to a failure to identify the problematic build.

BRIEF DESCRIPTION OF THE DRAWINGS

The present disclosure is illustrated by way of example, and not by way of limitation, in the figures of the accompanying drawings.

DETAILED DESCRIPTION

The present disclosure relates to systems and methods that determine a problematic build of a software application associated with multiple builds. The systems and methods may identify the problematic build in view of performance degradation between consecutive builds and a confidence level associated with the computation of the performance degradation. Further, implementations of the present disclosure may identify a selected build to run one or more additional iterations of a performance test so as to reliably and efficiently identify the build that causes performance degradation (also referred to as a "problematic build".)

Implementations of the present disclosure may include a method. The method may include calculating a performance metric for each of a plurality of builds of a software application in view of a respective performance test result associated with each of the plurality of builds, calculating a respective difference in performance metrics for each pair of consecutive builds of the plurality of builds, determining a largest performance drop in view of respective differences in the performance metrics among the pairs of consecutive builds of the plurality of builds, wherein the largest performance drop is associated with a first pair of consecutive builds comprising a first build and a second build, determining, by a processing device, a confidence level associated with the largest performance drop in view of performance test results associated with the first build and the second build, in response to determining that the confidence level is greater than or equal to a threshold, identifying one of the first build or the second build as a problematic build of the software application.

Implementations of the present disclosure may include a system including a memory including instructions and a processing device communicatively coupled to the memory. In an implementation, the processing device executes the instructions to calculate a performance metric for each of a plurality of builds of a software application in view of a respective performance test result associated with each of the plurality of builds, calculate a respective difference in performance metrics for each pair of consecutive builds of the plurality of builds, determine a largest performance drop in view of respective differences in the performance metrics among the pairs of consecutive builds of the plurality of builds, wherein the largest performance drop is associated with a first pair of consecutive builds comprising a first build and a second build, determine a confidence level associated with the largest performance drop in view of performance test results associated with the first build and the second build, and in response to determining that the confidence level is greater than or equal to a threshold, identify one of the first build or the second build as a problematic build of the software application.

Figure 1:
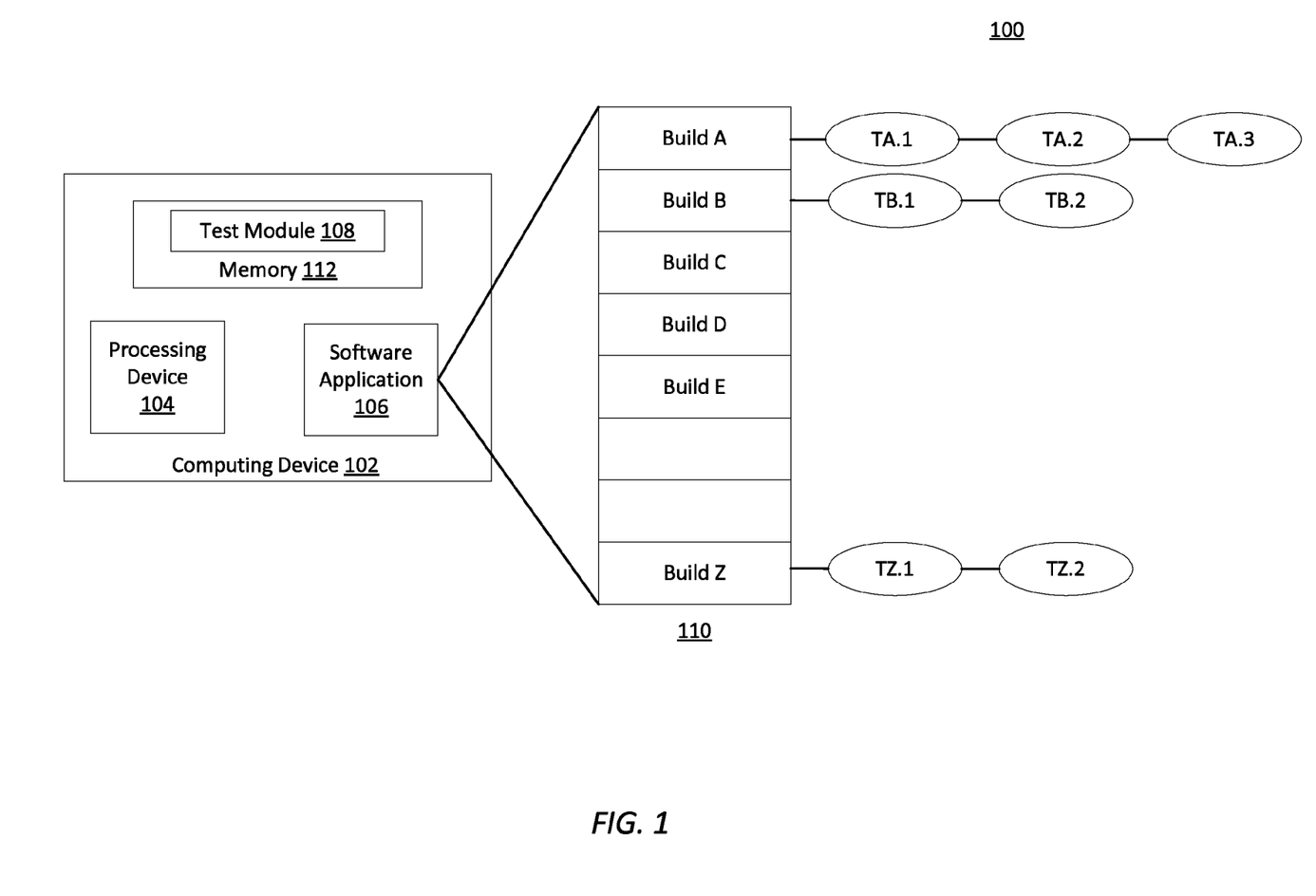
FIG. 1 illustrates a system that may execute performance tests for software applications, according to an implementation of the present disclosure.

FIG. 1 illustrates an exemplary system 100 that may execute performance tests on one or more builds of a software application (e.g., Software Application 106) according to an implementation of the present disclosure. As referred to herein, a performance test may include any test that measures an aspect of performance of a software application, including network performance (quantities measured using Netperf), storage performance (Iozone), and the specification benchmarks. In an implementation, the one or more performance tests may be run multiple times on the same version of the software application to generate multiple data samples of the performance test result, and the samples of the performance test may vary because of different circumstances of the testing environment. These variations among different runs may reflect the noise factor in the data samples.

In an implementation, system 100 may include a computing device 102, including a processing device 104 and a memory 112. Computing device 102 may be a computer, a laptop computer, a tablet, a smart phone, or any type of device that executes software applications. Processing device 104 may be a central processing unit that may include one or more processing cores (not shown). Further, processing device 104 may execute instructions of a software application 106 installed on the computing device 102. As discussed previously, prior to deployment, the software application 106 may undergo one or more performance tests to produce related test results. The tests may also run after the deployment of the software application as part of a continued performance monitoring process.

In one implementation, the memory 112 may include a test module 108 for testing the performance of software application 106. Processing device 104 may execute test module 108 to generate different scenarios of execution of software application 106 on computing device 102. The generated scenarios may simulate, although not exhaustively, operational states of computing device 102 during execution of software application 106. Additionally, the processing device 104 may execute test module 108 to run the performance tests and record the performance test results associated with the software application 106 under one or more operational scenarios. For example, during code development, the code of software application 106 may be modified and tuned in view of the performance test results until the performance test results satisfy certain criteria established for the software application 106 during a design phase.

In an implementation, the software application 106 may be compiled and packaged as a build of software application 106 to be released as a product. Software application 106 may be developed through stages each of which may include incremental code modifications, updates, changes, additions, etc. that fix bugs and/or add new features. Thus, through the life cycle of software application 106, a version, update, or embodiment of the software application 106 may be manifested in the form of a respective build. From the perspective of a software developer, these builds of software application 106 may be archived in a storage device 110 that may be later mounted onto computing device 102 to run more performance tests in the event that further tests on an earlier build are needed. For example, as shown in FIG. 1, software application 106 through the life cycle of its development may include multiple builds (e.g., Build A through Build Z, presented in chronological order of code development and progression), each of which may contain code modifications (additions and/or subtractions).

In an implementation, processing device 104 may execute one or more runs of one or more performance tests on a particular build of software application 106 to generate one or more test results. For example, as shown in FIG. 1, after the code of Build A is stabilized, processing device 104 may execute test module 108 (instructions of the test module 108 may be stored on memory 112) to conduct one or more runs of a performance test on Build A to generate data samples of test results (e.g., TA.1 through TA.3). The generated test results may be associated with Build A and, in some implementations of the present disclosure, archived in storage device 110. Similarly, other builds, such as Build B and Build Z, may also be associated with their respective test results (e.g., TB.1-TB.2 and TZ.1-TZ.2), generated in view of performance testing runs on these builds.

As previously discussed, some builds may be released to fix specific problems or issues, such as bugs. Although these builds may be specifically tested to ensure the bug fixes are working, a full scale performance test may not necessarily be conducted. Thus, for certain builds, there may be no associated performance test results. For example, as shown in FIG. 1, Builds C-E may be the kind of builds that have not been tested for performance or do not have test results associated with each of them.

When executed, each of the performance test results may include a set of measurements of aspects of the execution of software application 106 on computing device 102. For example, the measured aspects may include, e.g., network performance, CPU consumption, storage measurements, and in particular, including, throughput (Megabits/second), round trip time between request and response, number of interrupts, ratio of throughput vs. CPU consumption, and read/write performance of the storage in view of different types of accesses (sequential access or random access).

Figure 2:
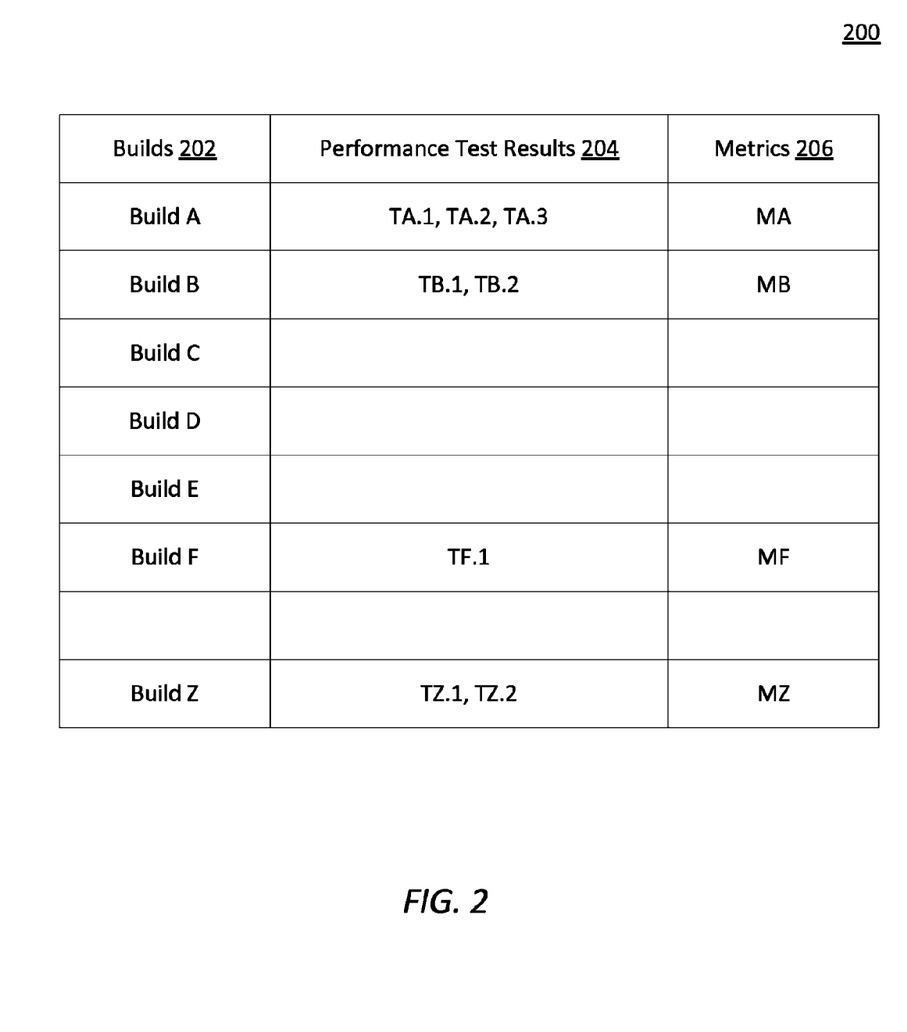
FIG. 2 illustrates an exemplary data array having stored therein performance testing results and performance metrics, according to an implementation of the present disclosure.

The performance test results for the builds of the software application 106 may be stored in a suitable data structure object such as an array. FIG. 2 illustrates an array 200 that may contain identifiers 202 of different builds (such as Build A through Build Z) and the performance test results 204 for these builds. For example, as shown in FIG. 2, Builds A, B, Z may be associated with performance test results (TA.1, TA.2, TA.3), (TB.1, TB.2), and (TZ.1, TZ.2), respectively, while Builds C-E are not associated with any test results since they have yet been performance tested.

In one implementation, each of the performance test results (e.g., TA.1-TA.3) may be a scalar quantity. For example, a performance test result may be a measurement of a time duration associated with the performance of a particular task or operation. In another implementation, each of the performance test results may be a vector quantity that may include a number of member elements, wherein each member element represents a measurement of one aspect of the execution of software application 106.

In one implementation, processing device 104 may execute instructions to calculate a performance metric 206 from data samples of the performance test result 204 for the associated build. In one implementation, a performance metric (such as MA, MB, or MZ) may be an average of the data samples of performance test results for that build. For example, MA may be the average (either scalar or vector) of multiple samples (e.g., TA.1-TA.3). In other implementations, the performance metric may be any suitable statistical measurement of a set of data samples of performance test results, such as, for example, absolute average value.

In an implementation, array 200 may include a column 206 that may contain performance metrics for one or more builds (e.g., Builds A, B, and Z) that have been performance tested and are associated with test results. However, for builds (e.g., Builds C-E) that have not been performance tested and are not associated with corresponding test results, the corresponding performance metrics may be an empty field. The differences between values stored in two consecutive non-empty performance metric fields may indicate an amount of change in terms of the performance of software application 106. Two builds including a first build and a second build are deemed to be consecutive if the second build is the immediate release of the software application after the release of the first build. The second build may include the incremental code changes from the first build. In one implementation, a big increase (or decrease) of the performance metric from one build to another build may indicate a big performance degradation between these two builds. Although the difference between the performance metrics of two builds may provide hints of performance degradation due to the modification to the code of software application 106, the hint may not be reliable in the presence of noise in the test results. Therefore, in addition to the differences, a reliability for computing these differences may also need to be considered.

Implementations of the disclosure search for not only the greatest performance degradation (manifested as a largest performance metric difference between two consecutive tested builds), but also a confidence level associated with the greatest performance degradation (also referred to as a "largest performance drop"). A confidence level associated with the greatest performance degradation is the likelihood or probability that the greatest performance degradation is statistically valid in the presence of noise in the data samples. Thus, the confidence level may measure how reliable the computation of the greatest performance degradation is. As commonly understood, the reliability of computation increases when the number of data samples increases.

As understood, there may be untested builds (such as those releases designed to fix certain bugs only) between two consecutive tested builds. If the greatest performance degradation is calculated with a high confidence level (such as greater than a predetermined threshold), the performance degradation may be attributed to the code modifications between the two builds associated with the greatest degradation. On the other hand, if the confidence level for the largest performance degradation is not high enough (such as less than the predetermined threshold), processing device 104 may select a build in view of the history of the performance tests conducted, and conduct additional runs of the performance tests on the selected build to generate more data samples.

Figure 3:
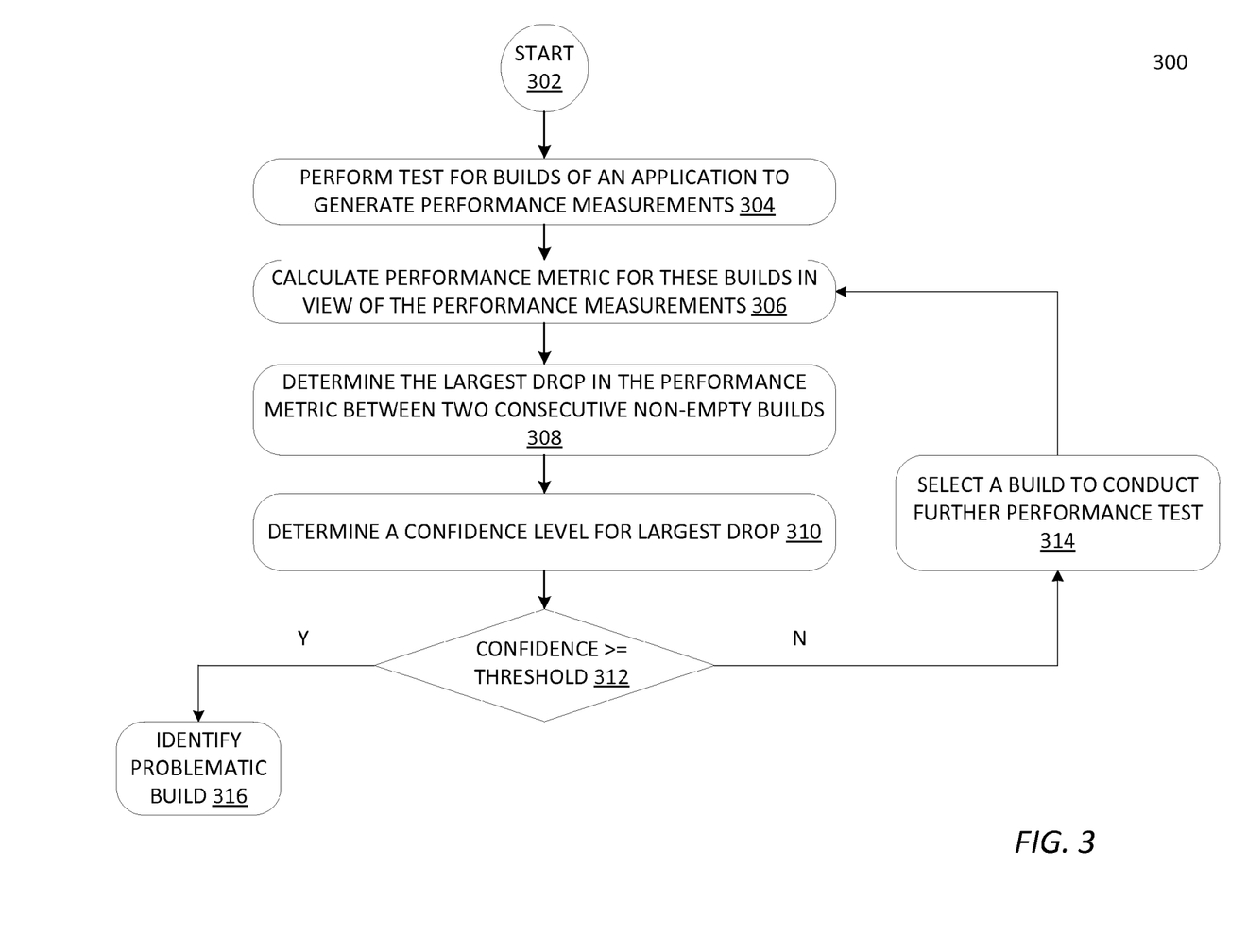
FIG. 3 illustrates a flow diagram of an exemplary method to determine a problematic build of a software application, according to implementations of the present disclosure.

FIG. 3 illustrates a flow diagram of an exemplary method 300 to identify a particular build of multiple builds of a software application that causes a level of performance degradation, according to an implementation of the disclosure. Method 300 may be performed by a processing logic that may include hardware (e.g., circuitry, dedicated logic, programmable logic, microcode, etc.), software (e.g., instructions run on a processing device to perform hardware simulation), or a combination thereof. In one example, method 300 may be performed by processing device 104 as shown in FIG. 1.

For simplicity of explanation, methods are depicted and described as a series of acts. However, acts in accordance with this disclosure can occur in various orders and/or concurrently, and with other acts not presented or described herein. Furthermore, not all illustrated acts may be required to implement the methods in accordance with the disclosed subject matter. In addition, the methods could alternatively be represented as a series of interrelated states via a state diagram or events. It should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

The operations as shown in FIG. 3 may start in response to the occurrence of an event (e.g., increased performance degradation) or according to a schedule (e.g., monthly, annually). Referring to FIG. 3, at 302, processing device 104 may determine a build containing code modifications that cause performance degradation for a software application. The software application may be a system software, such as an operating system or application software, like a word processing application. Through its life cycle, the software application may have undergone many modifications such as major revisions, minor updates, and/or bug fixes. The modified versions of the software application may be released as builds of the software application to users. In one implementation, although the latest build of the software application may run on a computing device, prior builds of the software application may have been archived on a storage device so that they may be retrieved and reinstalled for further performance testing.

At 304, processing device 104 may execute a performance test program to conduct one or more performance tests on one or more builds of the software application. As discussed before, the performance tests may include any test measuring a performance aspect of the software application. In one implementation, processing device 104 may execute the same test program on different builds of the software application to measure a set of performance parameters T. The values of T measured by processing device 104 executing the test program may indicate the performance of the builds of the software application. In another implementation, processing device 104 may execute different test programs on different builds. However, the execution of different test programs may generate measurements on a same set of performance parameters that may be used to compare the performance of different builds. In an implementation, the performance test results may refer to the measurements of a same set of performance parameters that can be compared between multiple different builds.

In one implementation, processing device 104 may execute the test program on a particular build of the software application multiple times to generate a number of data samples of the performance test result. Thus, certain builds may be associated with performance test results while other builds may not be associated with performance test results. In one implementation, the performance test results may be stored in an array such as the one shown in FIG. 2. The array may include a column that may include a number of fields storing one or more data samples of test results and one or more empty fields. The fields of the column may be ordered according to the time when the build was generated. For example, builds may be indexed from A though Z, wherein Build A and test results TA indicate the earliest build and test results of the software application, and Build Z and test results TZ indicate the latest build and test results of the software application. In practice, the builds may be ordered according to a timeline while the performance tests may be performed on these builds at any time.

At 306, processing device 104 may execute the test program to calculate a performance metric for each build using data samples of the performance test result for the build. In one implementation, the performance metric may be a statistical measurement (such as an average) of the samples of the test results for the build. The calculated performance metric may be stored in the same array as shown in FIG. 2. However, builds that had not been previously tested (or untested builds) do not have corresponding calculated performance metrics. As shown in FIG. 2, performance metrics may be stored in corresponding fields.

In an implementation, processing device 104 may execute the test program to construct a second array in which the empty fields are removed so that the performance test results and performance metrics may be stored in adjacent fields of the second array.

At 308, processing device 104 may execute the test program to calculate the differences in performance metrics between two consecutive performance-tested builds. In one implementation, performance metric differences may correspond to performance degradations of the software application or a performance drop. For example, an increase in the performance metric value may indicate a degradation of the software application performance. Thus, the increase in the performance metric value may represent a performance drop.

In one implementation, a specific quantity of the performance test results may be selected to compute the performance metric. For example, among all of the quantities that have been tested, a network performance test (e.g., the ratio of throughput/CPU consumption) may be selected as the performance metric used in the performance regression testing. The network performance test may be selected due to the discovery of a regression in the latency of pocket processing. When there are multiple data samples of the particular quantity, a statistical value (e.g., average) of the data samples for a build may be used as the performance metric.

In one implementation, the performance metric differences between two consecutive performance-tested builds may be stored in another data structure object such as a third data array. In one implementation, processing device 104 may execute the test program to determine the largest performance drop which may correspond to the largest increase in the difference between the performance metrics of two consecutive performance-tested builds. For example, the largest performance drop may be between a first build and a second build, where the first and second builds are consecutive tested builds. The largest performance drop may indicate a candidate for the build that leads to the performance degradation of the software application.

Although a large change in a performance metric value may indicate a potentially problematic build, further investigation may be needed to determine if the performance drop is caused by real performance degradation or by noise in the performance data. At 310, processing device 104 may further execute the test program to determine a confidence level associated with the computation of the largest performance drop. In the event that the confidence level (or reliability) is not enough because of insufficient data samples, more tests may be performed to increase the sample size. In one implementation, the confidence level may be determined using statistical hypothesis testing methods. In one implementation, the confidence level may be determined using a T-test. The largest performance drop is computed to be between a first build and a second build, which are consecutive performance-tested builds. It is assumed that samples of testing results of the first build and the second build are distributed according to a Normal distribution. Processing device 104 may further calculate the mean and standard deviation of the test results (assuming Normal distributions) for the first and second builds, respectively, and further calculate a confidence level using the calculated means and standard deviations of first and second builds.

The confidence level may indicate the reliability of the computation to identify the largest performance drop since the performance metrics are computed from data samples using statistical methods. In an implementation, at 312, the processing device compares the calculated confidence level of the largest performance drop with a threshold value. The threshold value may be any suitable value, and may be selected by a user of the system. For example, in one particular implementation, the threshold value may be selected to be 95%. If the processing device 104 determines that the calculated confidence level is greater than or equal to the threshold value at 316, processing device 104 may identify that one of the first or second builds is a problematic build (e.g., a build which includes code causing performance degradation during the execution of the software application). For example, if the second build includes the incremental code changes (addition or removal of codes) from the first build, the second build may be identified as the problematic build.

On the other hand, if processing device 104 determines that the confidence level is less than the threshold value, the largest performance drop may be deemed unreliable and one or more additional runs of a performance test may be needed to generate more data samples. At 314, processing device 104 may select a particular build out of the archived builds of the software application to conduct more performance tests. The selected build may be a previously tested build, or alternatively, an untested build (a build that has not been tested) of the software application. In one implementation, if the first and second builds are adjacent builds (i.e., they are consecutive releases of the software product), processing device 104 may calculate scatter values S for the first and second builds, where the scatter values $S_{1,2}=SD_{1,2}/\sqrt{NS_{1,2}}$, where $S_{1,2}$ represent the scatter values for the first and second builds, and respectively, $SD_{1,2}$ represent the standard deviations for the testing result samples of the first and second builds, and $NS_{1,2}$ are the sample sizes of the test results. In one implementation, processing device 104 may choose the build with the higher S value to conduct more performance testing. When the first and second builds are not adjacent to each other, or there are a number of untested builds (or with no testing results) between the first and second builds, processing device 104 may choose a build in the middle of the untested builds to conduct performance tests. As discussed above, in one implementation, the additional performance tests may be the same type as those that had been performance tested.

In response to the selection of a build to conduct further performance test that generates further testing results, processing device 104 may go to 306 to repeat the operations of method 300 with an updated pool of tested builds. Processing device 104 may execute the performance test on a selected build of the software application to generate a further performance test result for the selected build and calculate a performance metric for the selected build in view of the further performance test result. For example, if the selected build is a previously untested build, the performance metric for the untested build may be calculated in view of the new performance test results. However, if the selected build is one of those tested builds of the software application, the new test results may be added to the existing test results for calculating a new performance metric of the selected build. If the selected build is not one of the tested builds, it may be added in to the pool of tested builds after performance testing. Subsequently, processing device 104 may repeat the process to determine problematic build. In one implementation, processing device 102 may calculate a respective difference in performance metrics for each pair of consecutive builds of the plurality of builds, determine an updated largest performance drop among the pairs of consecutive builds of the plurality of builds, wherein the updated largest performance drop is associated with a second pair comprising a third build and a fourth build, determine a second confidence level associated with the updated largest performance drop in view of performance test results associated with the third build and the fourth build, determine that the second confidence level is greater than or equal to a threshold, and identify one of the third build or the fourth build as a problematic build of the software application.

Thus, in this way, the build that causes performance degradation for software applications may be identified efficiently and reliably by taking into consideration both the largest performance drop of performance degradation and the confidence level associated with the largest performance drop.

Although implementations of the present disclosure are discussed in the context of testing software applications, the performance regression testing as described in the implementations is also applicable to performance testing of hardware devices such as automobiles or any suitable devices whose performance metrics for different versions of the hardware devices can be conducted. For example, a car may have undergone many changes throughout the years. When a certain issue is uncovered with respect to the car, the performance regression testing over these versions may be applied to the car with respect to the particular issue.

Figure 4:
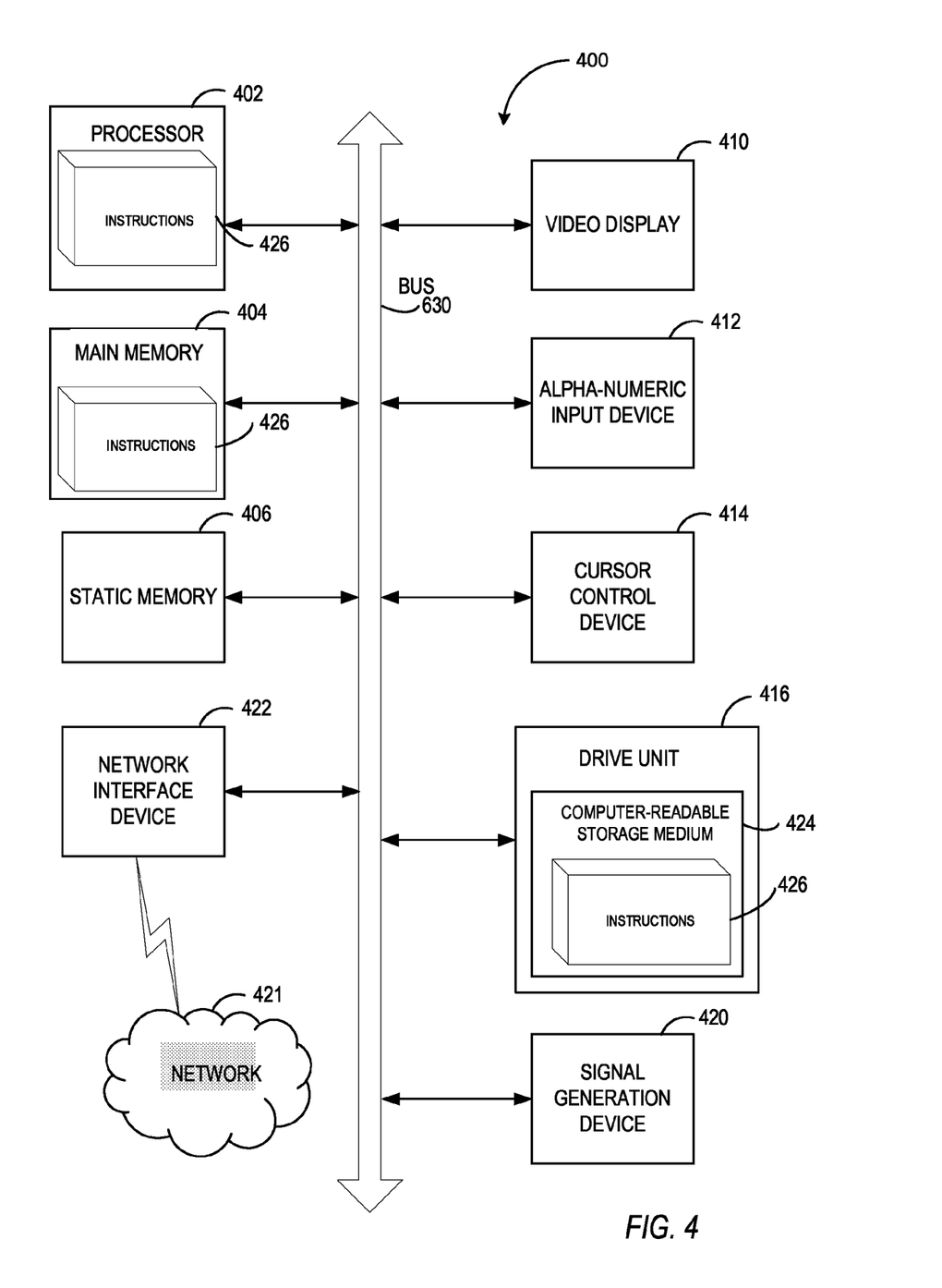
FIG. 4 is a block diagram illustrating an exemplary computer system, according to implementations of the present disclosure.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., instructions of the annotation subsystem 112). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 722.

While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers, or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   calculating a performance metric for each of a plurality of builds of a software application in view of a respective performance test result associated with each of the plurality of builds;
   calculating a respective difference in performance metrics for each pair of consecutive builds of the plurality of builds;
   determining a largest performance drop in view of respective differences in the performance metrics among the pairs of consecutive builds of the plurality of builds, wherein the largest performance drop is associated with a first pair of consecutive builds comprising a first build and a second build;
   determining, by a processing device, a confidence level associated with the largest performance drop in view of performance test results associated with the first build and the second build; and
   in response to determining that the confidence level is greater than or equal to a threshold, identifying one of the first build or the second build as a problematic build of the software application.

2. The method of claim 1, further comprising:
   in response to determining that the confidence level is less than the threshold,
      executing a performance test on a selected build of the software application to generate a further performance test result for the selected build; calculating a further performance metric for the selected build in view of the further performance test result;
      adding the selected build into the plurality of builds;
      calculating a respective difference in performance metrics for each pair of consecutive builds of the plurality of builds;
      determining an updated largest performance drop in view of respective differences in the performance metrics among the pairs of consecutive builds of the plurality of builds, wherein the updated largest performance drop is associated with a second pair comprising a third build and a fourth build;
      determining a second confidence level associated with the updated largest performance drop in view of performance test results associated with the third build and the fourth build;
      determining that the second confidence level is greater than or equal to the threshold; and
      identifying one of the third build or the fourth build as a problematic build of the software application.

3. The method of claim 2, wherein the selected build of the software application is an untested build between the first build and the second build.

4. The method of claim 2, wherein the selected build of the software application is selected from one of the first build or the second build in view of a number of performance test results of the first build and a number of performance test results of the second build.

5. The method of claim 1, wherein the plurality of builds are part of all builds of the software application, and wherein the plurality of builds are ordered chronologically according to progress of software application development.

6. The method of claim 1, wherein the performance test result comprises at least one of a time to execute part of the software application, an amount of data transmitted on a network device over a specific time period, or an amount of computational resources consumed.

7. The method of claim 1, wherein the performance metric associated with each of the plurality of builds comprises an average of a plurality of samples of the performance test result associated with each of the plurality of builds.

8. The method of claim 1, wherein determining the largest performance drop comprises identifying a largest difference among all differences in the performance metrics among the pairs of consecutive builds.

9. The method of claim 1, wherein determining the confidence level associated with the largest performance drop comprises performing a T-test in view of the test results associated with the first build and the second build, and wherein performing the T-test comprises calculating a respective average of the test results associated with the first build and the second build, and a respective standard deviation of the test results associated with the first build and the second build.

10. The method of claim 1, wherein the threshold is at 95%.

11. A non-transitory machine-readable storage medium storing instructions which, when executed, a processing device to:
calculate a performance metric for each of a plurality of builds of a software application in view of a respective performance test result associated with each of the plurality of builds;
calculate a respective difference in performance metrics for each pair of consecutive builds of the plurality of builds;
determine a largest performance drop in view of respective differences in the performance metrics among the pairs of consecutive builds of the plurality of builds, wherein the largest performance drop is associated with a first pair of consecutive builds comprising a first build and a second build;
determine, by a processing device, a confidence level associated with the largest performance drop in view of performance test results associated with the first build and the second build; and
in response to determining that the confidence level is greater than or equal to a threshold, identify one of the first build or the second build as a problematic build of the software application.

12. The machine-readable storage medium of claim 11, wherein the processing device is further to:
in response to determining that the confidence level is less than the threshold,
execute a performance test on a selected build of the software application to generate a further performance test result for the selected build;
calculate a further performance metric for the selected build in view of the further performance test result;
add the selected build into the plurality of builds;
calculate a respective difference in performance metrics for each pair of consecutive builds of the plurality of builds;
determine an updated largest performance drop in view of respective differences in the performance metrics among the pairs of consecutive builds of the plurality of builds, wherein the updated largest performance drop is associated with a second pair comprising a third build and a fourth build;
determine a second confidence level associated with the updated largest performance drop in view of performance test results associated with the third build and the fourth build;
determine that the second confidence level is greater than or equal to the threshold; and
identify one of the third build or the fourth build as a problematic build of the software application.

13. The machine-readable storage medium of claim 12, wherein the selected build of the software application is an untested build between the first build and the second build.

14. The machine-readable storage medium of claim 12, wherein the selected build of the software application is selected from one of the first build or the second build in view of a number of performance test results of the first build and a number of performance test results of the second build.

15. The machine-readable storage medium of claim 11, wherein the plurality of builds are part of all builds of the software application, and wherein the plurality of builds are ordered chronologically according to progress of software application development.

16. The machine-readable storage medium of claim 11, wherein the performance metric associated with each of the plurality of builds comprises an average of a plurality of samples of the performance test result associated with each of the plurality of builds.

17. The machine-readable storage medium of claim 11, wherein determining the confidence level associated with the largest performance drop comprises performing a T-test in view of the test results associated with the first build and the second build, and wherein performing the T-test comprises calculating a respective average of the test results associated with the first build and the second build, and a respective standard deviation of the test results associated with the first build and the second build.

18. A system, comprising:
a memory comprising instructions; and
a processing device communicably coupled to the memory and to execute the instructions to:
calculate a performance metric for each of a plurality of builds of a software application in view of a respective performance test result associated with each of the plurality of builds;
calculate a respective difference in performance metrics for each pair of consecutive builds of the plurality of builds;
determine a largest performance drop in view of respective differences in the performance metrics among the pairs of consecutive builds of the plurality of builds, wherein the largest performance drop is associated with a first pair of consecutive builds comprising a first build and a second build;
determine a confidence level associated with the largest performance drop in view of performance test results associated with the first build and the second build; and
in response to determining that the confidence level is greater than or equal to a threshold, identify one of the first build or the second build as a problematic build of the software application.

19. The system of claim 18, wherein the processing device is further to:
in response to determining that the confidence level is less than the threshold, execute a performance test on a selected build of the software application to generate a further performance test result for the selected build;

calculate a further performance metric for the selected build in view of the further performance test result;

add the selected build into the plurality of builds;

calculate a respective difference in performance metrics for each pair of consecutive builds of the plurality of builds;

determine an updated largest performance drop in view of respective differences in the performance metrics among the pairs of consecutive builds of the plurality of builds, wherein the updated largest performance drop is associated with a second pair comprising a third build and a fourth build;

determine a second confidence level associated with the updated largest performance drop in view of performance test results associated with the third build and the fourth build;

determine that the second confidence level is greater than or equal to the threshold; and identify one of the third build or the fourth build as a problematic build of the software application.

20. The system of claim 19, wherein the plurality of builds are part of all builds of the software application, and wherein the plurality of builds are ordered chronologically according to progress of software application development.

* * * * *